(12) United States Patent  
Duarte et al.

(10) Patent No.: US 7,224,373 B1
(45) Date of Patent: *May 29, 2007

(54) ADJUSTABLE DATA PROCESSING DISPLAY

(75) Inventors: Matias Duarte, San Francisco, CA (US); Joseph Palmer, San Jose, CA (US)

(73) Assignee: Danger, Inc., Palo Alto, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 09/714,320

(22) Filed: Nov. 15, 2000

Related U.S. Application Data

(63) Continuation-in-part of application No. 09/545,701, filed on Apr. 7, 2000, now Pat. No. 6,735,624.

(51) Int. Cl.
*G09G 5/00* (2006.01)

(52) U.S. Cl. ................ 345/659; 345/168; 345/169; 345/184

(58) Field of Classification Search .......... 361/729, 361/681; 345/126, 204, 156–184, 659; 343/703
See application file for complete search history.

(56) References Cited

U.S. PATENT DOCUMENTS

| | | |
|---|---|---|
| 4,237,540 A | 12/1980 | Sato |
| 4,916,441 A | 4/1990 | Gombrich |
| 5,224,060 A | 6/1993 | Ma |
| 5,268,817 A | 12/1993 | Miyagawa et al. |
| 5,278,779 A * | 1/1994 | Conway et al. ............ 361/680 |
| 5,345,362 A | 9/1994 | Winkler |
| 5,548,477 A | 8/1996 | Kumar et al. |
| 5,628,817 A | 5/1997 | Fugleberg et al. |
| 5,638,257 A | 6/1997 | Kumar et al. |
| 5,661,632 A | 8/1997 | Register |
| 5,900,848 A * | 5/1999 | Haneda et al. ............. 345/1.1 |
| 5,901,035 A | 5/1999 | Foster et al. |
| 5,905,550 A | 5/1999 | Ohgam et al. |
| 5,949,408 A | 9/1999 | Kang et al. |
| 6,020,878 A | 2/2000 | Robinson |
| 6,125,040 A | 9/2000 | Nobuchi et al. |
| 6,433,777 B1 | 8/2002 | Sawyer |
| 6,446,004 B1 | 9/2002 | Cao et al. |
| 6,483,445 B1 | 11/2002 | England |
| 6,507,336 B1 * | 1/2003 | Lunsford .................... 345/168 |
| 6,525,715 B2 * | 2/2003 | Uchiyama et al. ........... 345/169 |
| 6,618,044 B1 * | 9/2003 | Gettemy et al. ............ 345/204 |
| 6,622,031 B1 * | 9/2003 | McCleary et al. .......... 343/702 |
| 6,665,173 B2 | 12/2003 | Brandenberg et al. |
| 6,977,645 B2 | 12/2005 | Brosnan |

FOREIGN PATENT DOCUMENTS

| | | |
|---|---|---|
| EP | 0 807 879 A2 | 11/1997 |
| GB | 2 331 204 A | 5/1999 |
| JP | 06-324759 | 11/1994 |
| JP | 10-055227 | 2/1998 |
| JP | 11-161367 | 6/1999 |

OTHER PUBLICATIONS

The PCT Search Report dated Dec. 13, 2001, 4 pages.
Suzuki, et al., Image Transferring Apparatus and Method, File Transferring Apparatus and Method, and Storage Medium, Jun. 2000.
Brandenbert, et al., "Physical Configuration Of A Handheld Electronic Communication Device", Provisional Application filed Dec. 20, 1999, U.S. Appl. No. 60/172,675.

* cited by examiner

*Primary Examiner*—Sumati Lefkowitz
*Assistant Examiner*—Srilakshmi K Kumar
(74) *Attorney, Agent, or Firm*—Blakely, Sokoloff, Taylor & Zafman, LLP

(57) ABSTRACT

An apparatus comprising: a data processing device; and a display coupled to the data processing device at a pivot point and rotatable around the pivot point from a closed position to an open position, wherein the display is viewable in both the closed and the open positions.

17 Claims, 14 Drawing Sheets

ADJUSTABLE DATA PROCESSING DISPLAY

PRIORITY

This application is a continuation-in-part of U.S. Ser. No. 09/545,701, filed Apr. 7, 2000, now U.S. Pat. No. 6,735,624 entitled "Network Portal Apparatus and Method."

BACKGROUND OF THE INVENTION

1. Field of the Invention

This invention relates generally to the field of data processing devices. More particularly, the invention relates to an adjustable display for a data processing device.

2. Description of the Related Art

Portable data processing devices such as Personal Digital Assistants ("PDAs") and programmable wireless telephones are becoming more powerful every day, providing users with a wide range of applications previously only available on personal computers. At the same time, due to advances in silicon processing technology and battery technology, these devices may be manufactured using smaller and smaller form factors. Accordingly, users no longer need to sacrifice processing power for portability when selecting a personal data processing device.

Although processing devices with small form factors tend to be more portable, users may find it increasingly difficult to interact with them. For example, entering data may be difficult due to the absence of a full-sized keyboard and reading information may be difficult due to a small, potentially dim Liquid Crystal Display ("LCD").

To deal with this problem, devices have been produced which physically adjust to an "active" position when in use and an "inactive" position when not in use. For example, the well-known Motorola® Star-TAC® wireless telephone flips open when in use, thereby exposing a telephone keypad, a display and an earpiece. However, when this device retracts to an "inactive" position, the keypad, display, and earpiece are all completely inaccessible.

Accordingly, what is needed is an improved, adjustable data processing device.

SUMMARY

An apparatus comprising: a data processing device; and a display coupled to the data processing device at a pivot point and rotatable around the pivot point from a closed position to an open position, wherein the display is viewable in both the closed and the open positions.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Network Architecture

Figure 1:
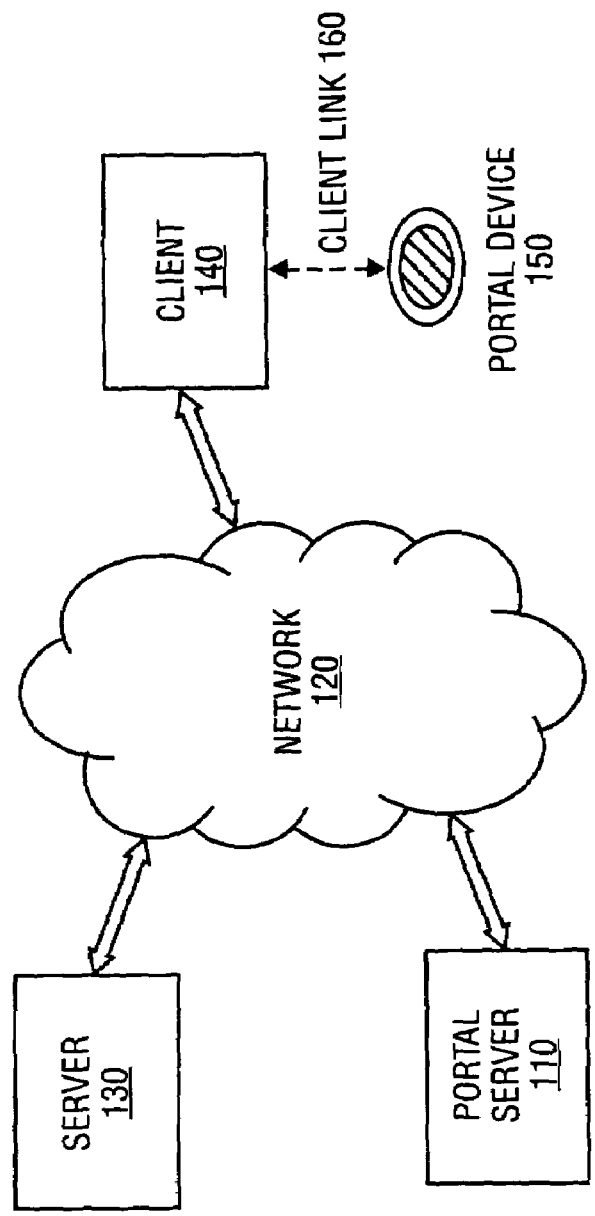
FIG. 1 illustrates an exemplary network architecture used to implement elements of the present invention.

Elements of the present invention may be included within a client-server based architecture 100 such as that illustrated in FIG. 1. According to the embodiment depicted in FIG. 1, a portal server 110 communicates with clients 140 and other network servers 130 over a network 120 (e.g., the Internet). The network 120 over which the clients 140 and servers 110, 130 transmit and receive data may be comprised of any combination of private (e.g., leased) and/or public communication channels. These may include, for example, Digital Signal ("DS") channels (e.g., DS-3/T-3, DS-1/T1), Synchronous Optical Network ("SONET") channels (e.g., OC-3/STS-3), Integrated Services Digital Network ("ISDN") channels, Digital Subscriber Line ("DSL") channels, cable modem channels and a variety of wireless communication channels including satellite broadcast and cellular channels.

In addition, various networking protocols may be used to support communication across the network 120 including, for example, the Asynchronous Transfer Mode ("ATM"), Ethernet, and Token Ring (at the data-link level); as well as Transmission Control Protocol/Internet Protocol ("TCP/IP"), Internetwork Packet Exchange ("IPX"), AppleTalk and DECnet (at the network/transport level). It should be noted, however, that the principles of the invention are not limited to any particular communication channel or protocol.

The portal server 110 in one embodiment includes a user database for storing various types of user configuration and account data. Users may register and login to the portal server 110 from a client 140 by specifying a user ID and/or password. According to one embodiment, a user connects to the servers 110, 130 via a browser application such as Netscape Navigator™ or Microsoft Internet Explorers which communicates via the Hypertext Transfer Protocol (hereinafter "HTTP").

In one embodiment, users may configure the portal server 110 to retrieve and manage specific types of information. For example, a user may configure the portal server 110 to retrieve up-to-date stock quotes for a specified set of stocks (e.g., reflecting the user's portfolio), to collect the weather forecast for the user's hometown, and/or to retrieve recent articles relating to a particular sports franchise. The portal server will then retrieve the specified information from other servers (e.g., server 130) on behalf of the user.

In addition to information retrieval and management, in one embodiment the portal server 110 also provides application services such as email, online scheduling (e.g., appointments, to-do lists, etc), instant messaging, contact management, word processing and a variety of other online services. Users may access these services by logging in to the portal server 110 with a valid user ID and password. In one embodiment, the portal server 110 generates a unique, personalized Web page for each user containing links to all, or a subset of, the information and/or services subscribed to by the user.

Embodiments of the Invention

Figure 2:
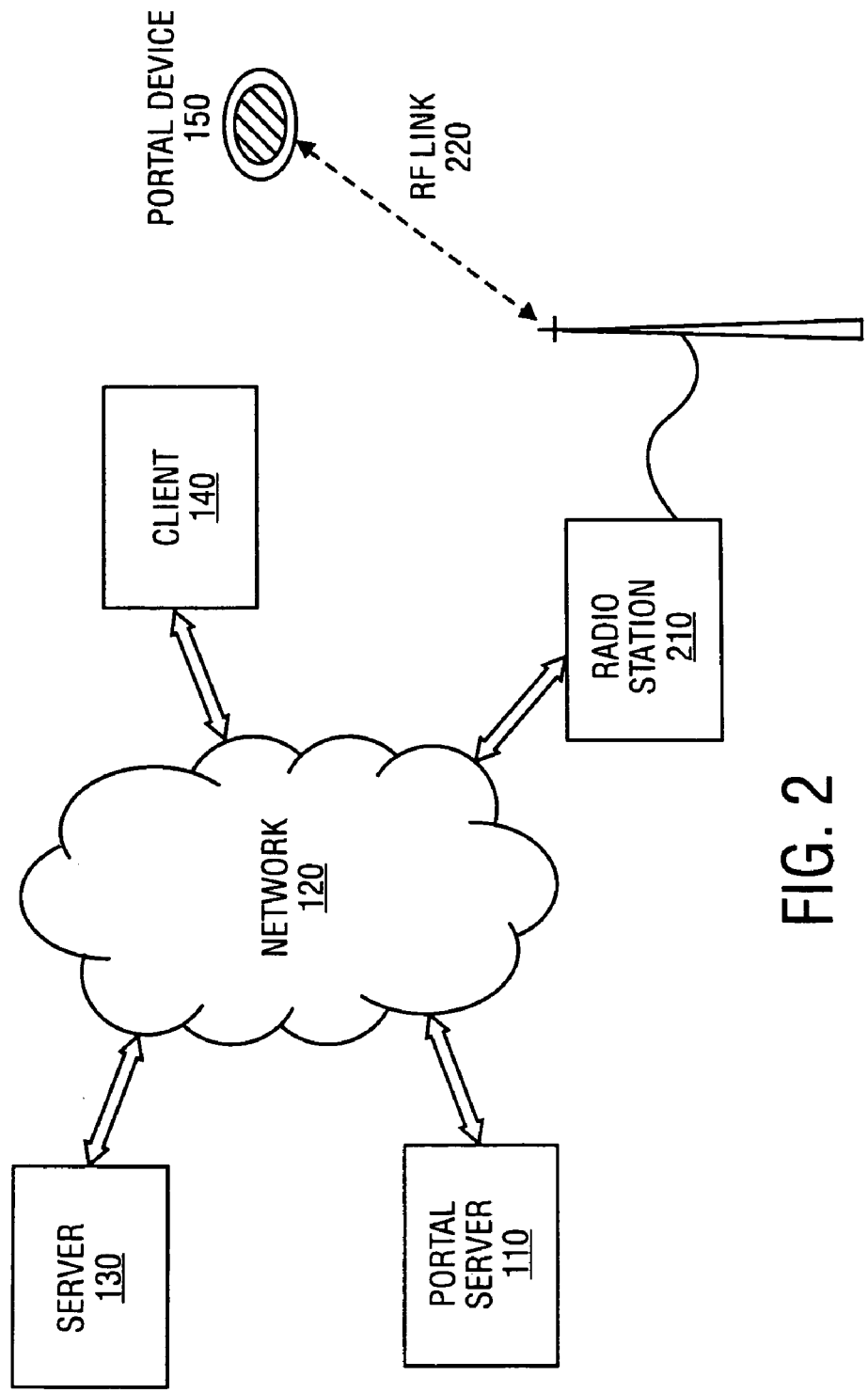
FIG. 2 illustrates another exemplary network architecture used to implement elements of the present invention.

In one embodiment, a portal device 150 stores and processes user-specified information and/or programs as well as non-user-specified information/programs (e.g., targeted advertisements based on the user's profile). The information/programs may be transmitted to the portal device 150 through the client 140, and/or directly via wireless broadcast (as illustrated in FIG. 2 and described in detail below). Thus, the portal device 150 in this embodiment is a removable extension of the portal server 110, storing a subset of the information and services maintained by the portal server 110 on behalf of the user. For example, a user may configure the portal server 110 to periodically download the user's to-do list (or other scheduling data) to the portal device (e.g., every morning, every two hours, every time the user connects the portal device to the client 140, etc). When the user leaves the office, he/she can simply take the portal device with him/her and view his/her schedule throughout the day.

The timing of the information/program download may depend on the particular embodiment of the portal device 150. For example, if a wireless embodiment is used (described below) downloads may occur at any time when the portal device 150 is within wireless transmission range, whereas if a non-wireless embodiment is used, downloads may be limited to periods of time when the portal device 150 is connected to the portal server 110.

In one embodiment, the user may customize the portal device 150 preferences and content which will be downloaded to the portal device 150 from the portal server 110. This may be accomplished, for example, by selecting certain preferences/content from a portal server 110 Web page (e.g., by using an online programming interface as described below). For example, the user may choose to have each day's to-do list downloaded to his portal device 150 and may also program the device 150 (e.g., via the portal server 110) to continually display the next scheduled event for the day. Various other user interface and content-based data may be transmitted to the portal device 150 from the portal server 110 while still complying with the underlying principles of the invention.

Client Link

As illustrated in FIG. 1, one embodiment of the portal device 150 communicates to the portal server 110 via a communication link 160 with the client 140. The communication link may be established via a physical I/O connection with the client 140 such as a Universal Serial Bus ("USB") interface or a communication ("serial") interface. Alternatively, the communication link 160 may be a wireless link such as an Infrared I/O channel or a radio frequency ("RF") I/O channel.

In one particular embodiment, the client link 160 is formed using a capacitively-coupled communication channel. As is known in the art, a capacitor is any dielectric sandwiched between two conductive elements. In this embodiment, one of the two conductive elements is located within the portal device 150 and the second of the two conductive elements is located external to the portal device 150 and is communicatively coupled to an I/O port of the client 140. For example, in one embodiment, the second conductive element may be disposed within user's mouse pad. According to this embodiment, the user may simply place the portal device on the mouse pad to set up the capacitive communication link 160 with the client 140. It should be noted, however, that various other client links 160 may be employed while still complying with the underlying principles of the invention.

Direct Radio Broadcast

In one embodiment, illustrated in FIG. 2, data and/or programs are transmitted to the portal device 150 from the portal server 110 over an RF link 220. In this embodiment, the organization maintaining the portal server 110 and/or implementing other features of the system and method described herein (hereinafter the "portal organization" or "PO"), may lease a portion of the RF transmission bandwidth from one or more radio stations 210. It should be noted, however, that various RF transmission techniques may be used without departing from the underlying principles of the invention.

Figure 3:
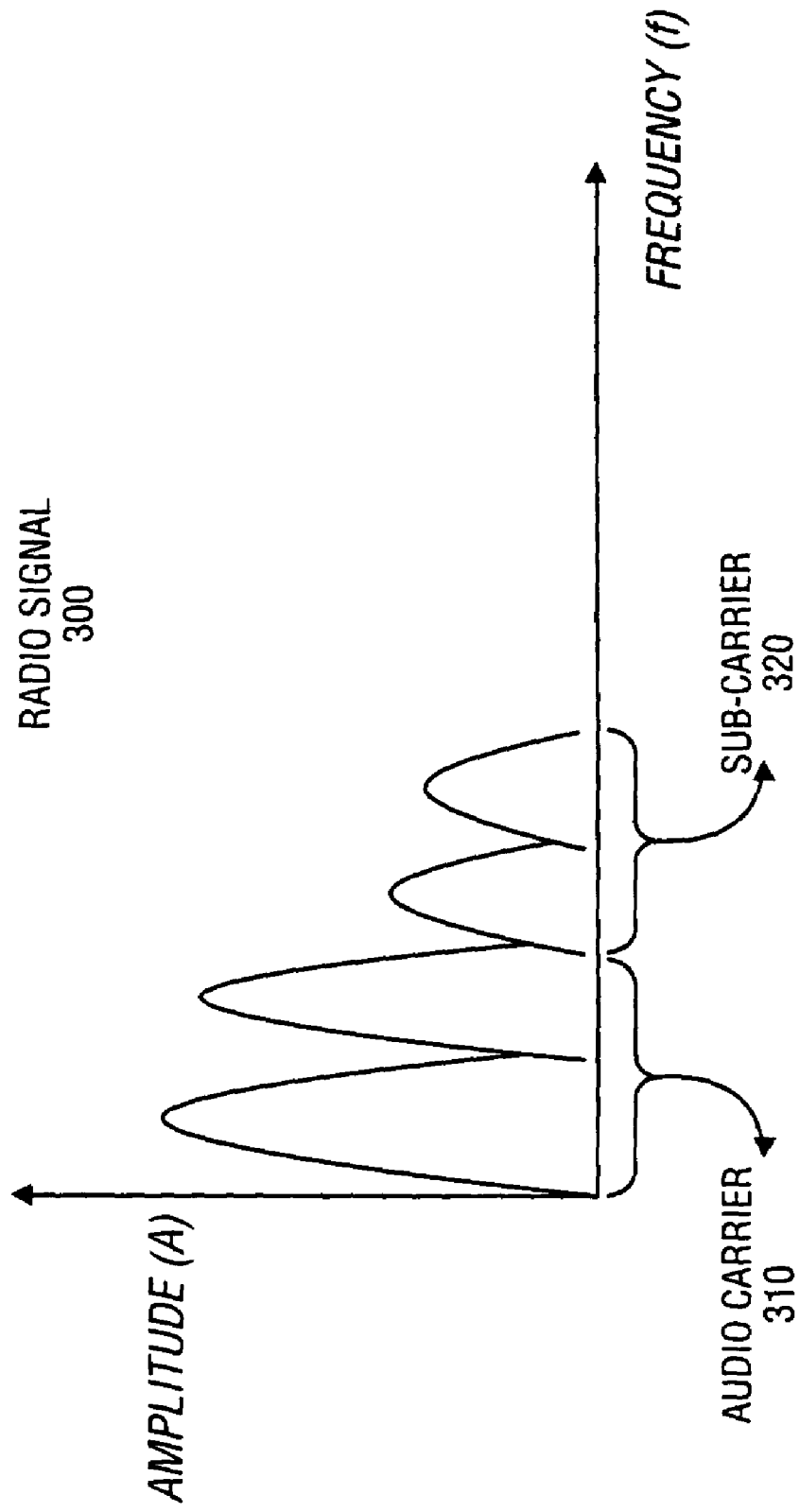
FIG. 3 illustrates a radio signal including its sub-carrier in the frequency domain.

Referring to FIG. 3, in one particular embodiment, the PO will use the radio station's sub-carrier frequency band 320 to transmit data and/or programs to the portal device 150. As it is known in the art, radio stations are licensed a sub-carrier frequency block 320 along with the audio carrier frequency block 310. Although some radio stations use the sub-carrier frequency block 320 (e.g., for foreign-language broadcast), most do not. As such, the present embodiment provides a mechanism for transmitting data over an infrequently-used wireless transmission channel.

To further conserve bandwidth within the sub-carrier frequency block 320, in one embodiment, the data transmitted over the RF link 220 is not addressed to any one specific portal device. Rather, in this embodiment, the data is simply transmitted (e.g., with a tag that identifies the data) and is sensed by any portal device(s) 150 listening within the sub-carrier block 320. This type of addressing will be referred to herein as "data addressable" addressing (in contrast to "device addressable addressing in which a device address is associated with the transmitted data). The individual portal devices 150 that sense the various data transmissions may ignore them or may take some other specified action (e.g., store and display the transmitted data), depending on how the devices 150 are configured. For example, a portal device 150 may be configured by a user to track stock quotes for stocks within his/her portfolio and to ignore all other stock quotes. Similarly, the user may configure the portal device 150 to listen for local weather reports, local news headlines, and/or any other information which may be accessed by the user directly at the portal server 110.

In one embodiment, the data broadcast in a particular geographical region will be selected based on the number of users in that region who have registered on the portal server 110 and/or the types of data requested by users in the region. For example, if no users in the region have configured the portal server 110 to gather a particular stock quotes then the portal server 110 will not transmit that stock quote over the RF link 220 in that region. Similarly, the portal server 110 may be configured to only transmit local data such as weather and local news in the local broadcast region to which the weather and news pertains (i.e., where it will most likely be requested). Broadcasting data selectively in this manner will further improve bandwidth over the RF link 220 (i.e., by reducing unnecessary data transmissions).

In one embodiment, portal devices 150 may be addressed directly (e.g., by including the device's serial number or other ID code in an address field of the data transmission). This embodiment may be provided by the PO to users as a "premium" service, under which the user pays an additional fee to receive personally-addressed information over the sub-carrier 360 (e.g., email messages, daily schedules, etc), as well as the more general information described above. Users of this embodiment may be charged on a subscription basis and/or on a per-use basis, depending on the embodiment. Of course, other pricing models may be employed while still complying with the underlying concept. The PO may also employ this embodiment under certain emergency situations (e.g., where it is crucial that a particular user receive a data transmission immediately).

Embodiments of the Portal Device

Figure 4:
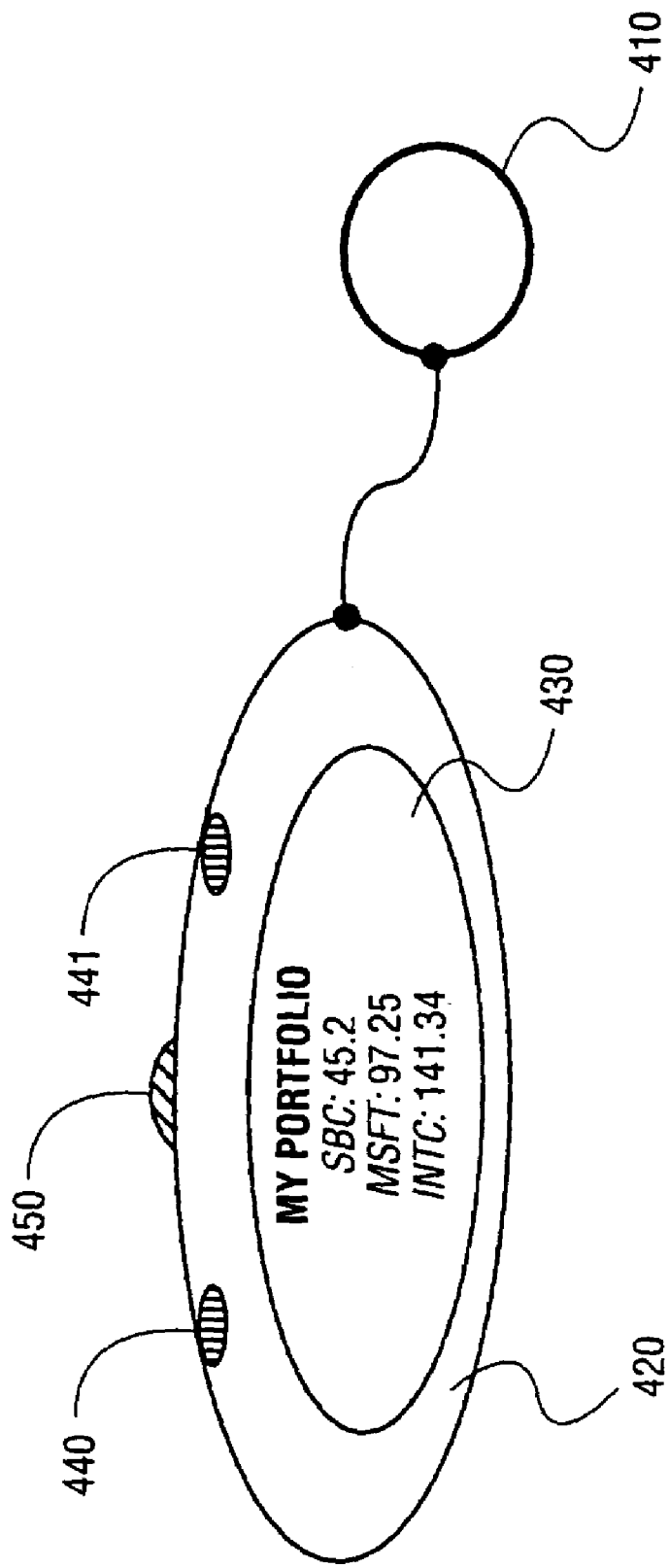
FIG. 4 illustrates an external view of a portal device according to one embodiment of the invention.

FIG. 4 illustrates an external view of one embodiment of a portal device 420 which may be used as a key chain. As shown, this embodiment includes a key chain ring 410 for securing a set of keys (or other personal effects) to the device 420. Also illustrated is a display 430 for displaying various types of portal data. In one embodiment the display is a Liquid Crystal Display ("LCD"). Of course, other display technologies may be implemented while still complying with the underlying principles of the invention (e.g., Light Emitting Diode ("LED") displays). Also included is a set of control buttons 440 and 441 for selecting menu items and/or jumping back and forth between stored portal data and a control knob 450 for scrolling between menu items and/or data. In one embodiment, the control knob 450 rotates on an axis which is substantially perpendicular to the plane of the display 430.

Additional attachable embodiments of the portal device 150 include a necklace configuration, a pocket watch configuration, and a sports configuration (e.g., wherein the portal device is strapped firmly around a user's arm). In the latter configuration, the shell of the portal device may be comprised of a water-proof material to avoid water damage to the internal components of the device.

Figure 5:
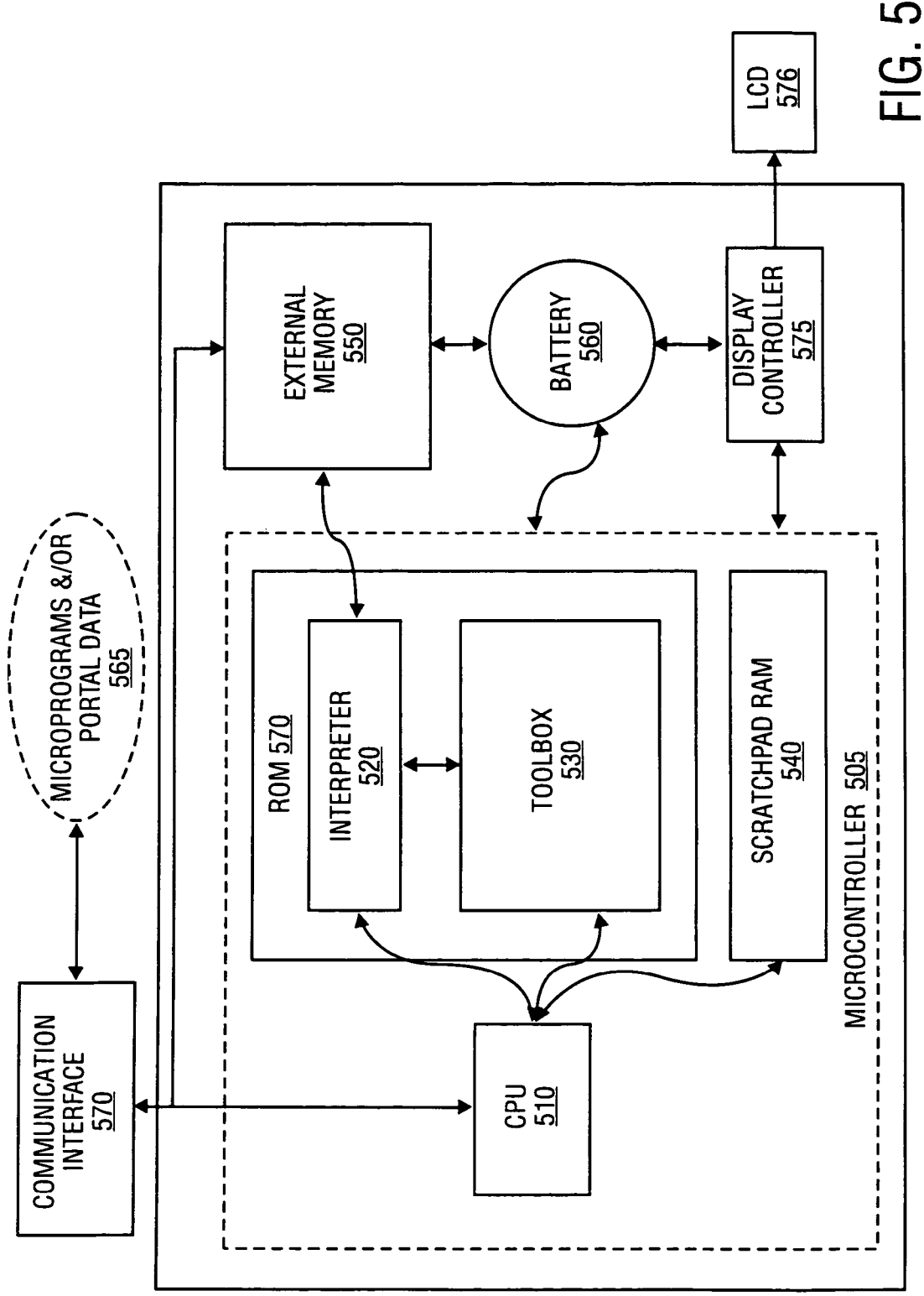
FIG. 5 illustrates an internal view of a portal device according to one embodiment of the invention.

As illustrated in FIG. 5, one embodiment of the portal device 150 is comprised generally of a microcontroller 505, an external memory 550, a display controller 575, and a battery 560. The external memory 550 may be used to store programs and/or portal data 565 transmitted to the portal device 150 from the portal server 110 (e.g., via client 140 and/or radio station 210). In one embodiment, the external memory 550 is non-volatile memory (e.g., an electrically erasable programmable read only memory ("EEPROM"); a programmable read only memory ("PROM"), etc). Alternatively, the memory 550 may be a volatile memory (e.g., random access memory or "RAM") but the data stored therein may be continually maintained via the battery 560. The battery 560 in one embodiment is a coin cell battery (e.g., of the same type used in portable electronic devices such as calculators and watches). In one embodiment, when the battery power decreases below a threshold level, the portal device 150 will notify the user and/or the portal server 110. The portal server 110 in one embodiment will then automatically send the user a new battery.

The microcontroller 505 of one embodiment is comprised of a central processing unit ("CPU") 510, a read only memory ("ROM") 570, and a scratchpad RAM 540. The ROM 570 is further comprised of an interpreter module 520 and a toolbox module 530.

The toolbox module 530 of the ROM 570 contains a set of toolbox routines for processing data, text and graphics on the portal device 150. These routines include drawing text and graphics on the portal device's display 430, decompressing data transmitted from the portal server 110, reproducing audio on the portal device 150, and performing various input/output and communication functions (e.g., transmitting/receiving data over the client link 160 and/or the RF link 220). A variety of additional portal device functions may be included within the toolbox 530 while still complying with the underlying principles of the invention.

In one embodiment, microprograms and portal data 560 are transmitted from the portal server 110 to the external memory 550 of the portal device via a communication interface 570 under control of the CPU 510. Various communication interfaces 570 may be employed without departing from the underlying principles of the invention including, for example, a Universal Serial Bus ("USB") interface or a serial communication ("serial") interface. The microprograms in one embodiment are comprised of compact, interpreted instructions known as "bytecodes," which are converted into native code by the interpreter module 520 before being executed by the CPU 510. One of the benefits of this configuration is that when the microcontroller/CPU portion of the portal device 150 is upgraded (e.g., to a faster and/or less expensive model), only the interpreter module 520 and toolbox 530 of the ROM needs to be rewritten to interpret the currently existing bytecodes for the new microcontroller/CPU. In addition, this configuration allows portal devices 150 with different CPUs to coexist and execute the same microprograms. Moreover, programming frequently-used routines in the ROM toolbox module 530 reduces the size of microprograms stored in the external memory 550, thereby conserving memory and bandwidth over the client link 160 and/or the RF link 220. In one embodiment, new interpreter modules 520 and/or toolbox routines 530 may be developed to execute the same microprograms on cellular phones, personal information managers ("PIMs"), or any other device with a CPU and memory.

One embodiment of the ROM 570 may be comprised of interpreted code as well as native code written specifically for the microcontroller CPU 505. More particularly, some toolbox routines may be written as interpreted code (as indicated by the arrow between the toolbox 530 and the interpreter module 520) to conserve memory and bandwidth for the same reasons described above with respect to microprograms. Moreover, in one embodiment, data and microprograms stored in external memory 550 may be configured to override older versions of data/microprograms stored in the ROM 570 (e.g., in the ROM toolbox 530).

Data Compression

As described above, microprograms and portal data may be transmitted to the portal device 150 in a compressed format. As such, in one embodiment, decompression logic is programmed into the microcontroller ROM 570 (e.g., within the toolbox 530) and is used to interpret and/or decompress the microprograms/data as they are received.

In one embodiment, a plurality of uncompressed data is stored in the ROM 570, and codes identifying the uncompressed data are transmitted across the RF link 220 and/or client link 160. For example, instead of transmitting the entire market code for a particular stock, such as "MSFT" for Microsoft, a compressed code, e.g., "M," may be transmitted to the portal device 150 instead. The ROM 570 in this embodiment may include a lookup table (or similar decode logic) for retrieving the real market code "MSFT," using the compressed code, "M." Once the real code is retrieved from the ROM 570, it may be displayed on the portal device 150 as illustrated in FIG. 4. It should be noted, however, that the underlying principles of the invention may be practiced using a variety of coding schemes and/or digital compression techniques.

User Registration and Authentication

Figure 6:
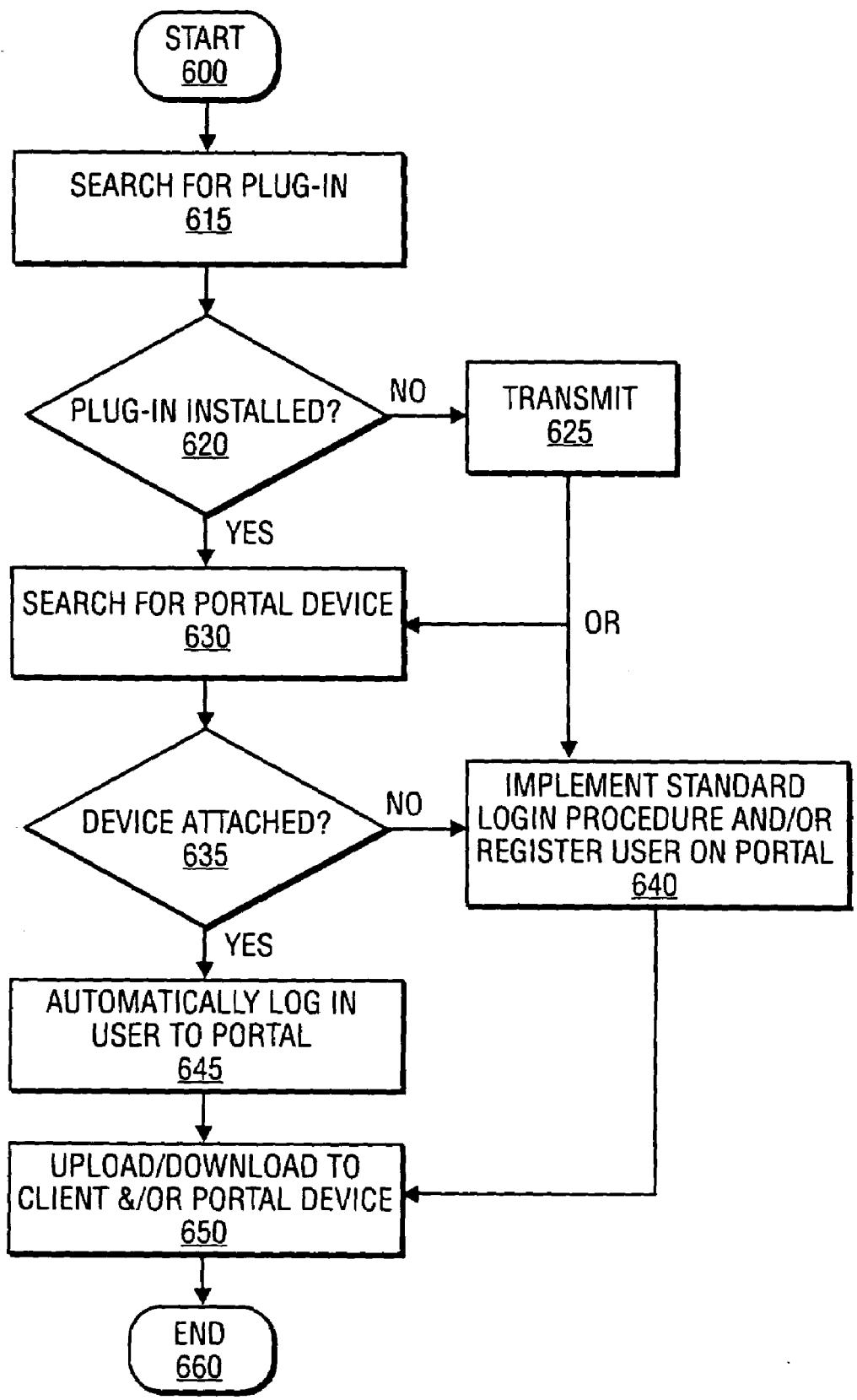
FIG. 6 illustrates a process according to one embodiment of the invention wherein a user is logged in to a portal server.

One embodiment of the invention will now be described with reference to the flowchart of FIG. 6. According to this embodiment, when a user initially connects to the portal server 110 (e.g., from client 140), the portal server 110 will determine whether a portal device plug-in is installed on the user's Web browser (at 615). As is known in the art, plug-ins are auxiliary programs added to Web browsers to provide them with new levels of functionality. One embodiment of the present invention uses a plug-in to coordinate communication between the portal server 110, the client 140, and the portal device 150. In addition, the plug-in may convert and/or compress "standard" portal programs/data (e.g., programs/data meant to be executed on the client 140) into microprograms/data that the portal device can properly interpret, as described herein. If the plug-in is not installed, the portal server 110 may automatically transmit and install it on the client 140 (at 625).

At 630, the portal server 110 (e.g., via the plug-in) determines whether the portal device is currently attached to the client 140. If the device 150 is attached then, in one embodiment, the portal server 110 will automatically log the user in. The portal server 110 may automatically authenticate the portal device 150 via a serial number and/or a user authentication key embedded/stored in the device 150. Once the user is logged in to the portal server, he/she can then transmit data to and from the portal device 150 as described herein.

If the device 150 is not attached, however, then the portal server 110 may implement a standard user name/password login procedure and/or may register the user (at 640). During the registration process the user may be asked to respond to a series of questions relating to his/her background (e.g., hobbies, education, career, etc). The portal server 110 may use this information to personalize the content collected and provided to the user and/or to target ads to the user based on the user's preferences. In addition, at this point the user may be provided with an opportunity to configure the portal server 110 to gather and manage specific information on behalf of the user (e.g., particular stocks, sports scores, news, etc) and/or to provide the user with access to certain online applications (e.g., email, electronic scheduling, etc) as described herein.

Online Programming Interface

Figure 7:
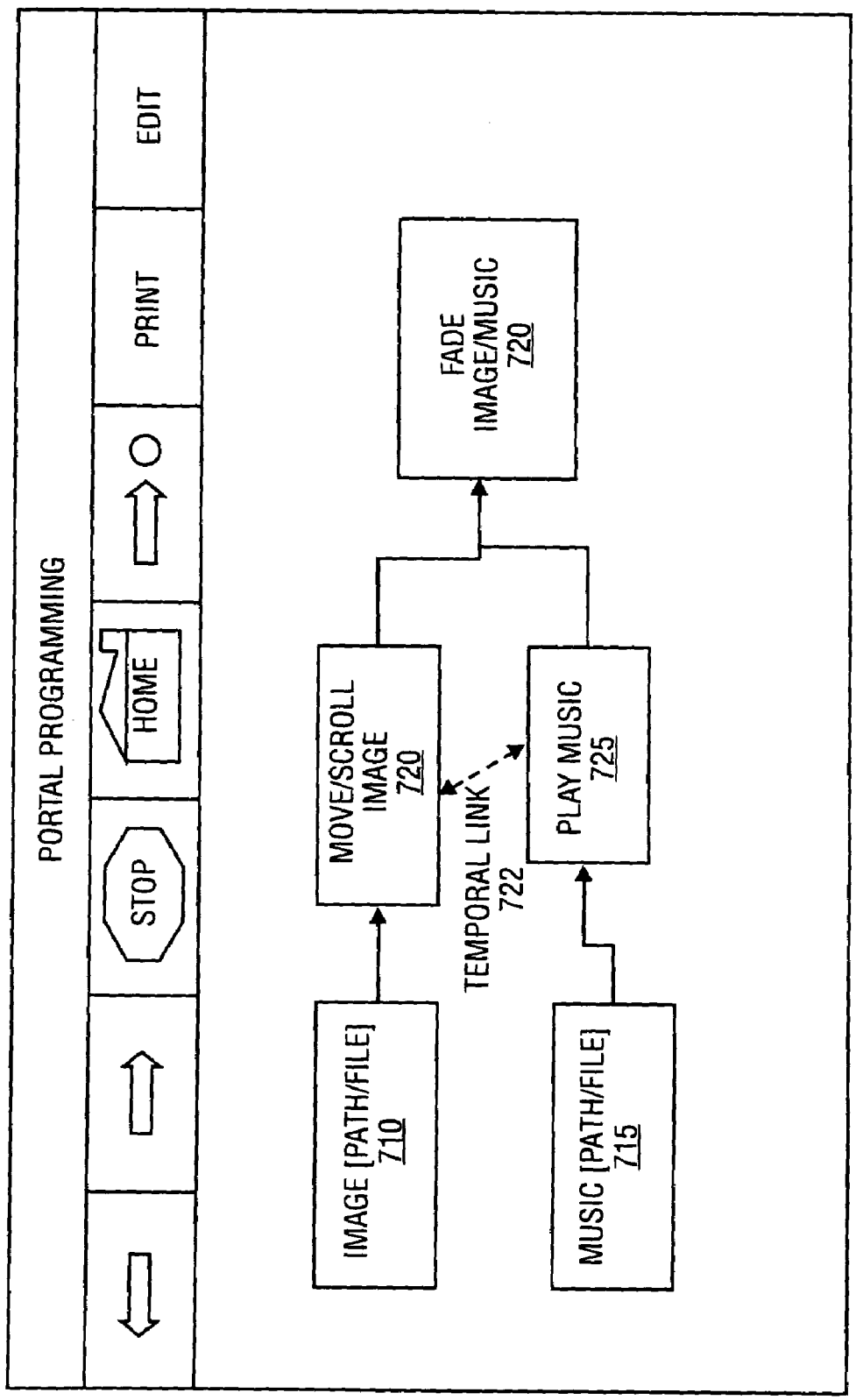
FIG. 7 illustrates a visual programming interface according to one embodiment of the invention.

In one embodiment, registered users are provided with an online visual programming interface such as that illustrated in FIG. 7. Under this embodiment users may construct their own microprograms to be executed on the portal device 150 and/or the client 140. For example, a user may define a programming block as a hyperlink which points to a particular piece of data or series of data (e.g., a current stock quote for AT&T, the San Francisco weather forecast, etc) and may also indicate how frequently the data associated with the hyperlink is to be updated. Multiple such blocks may be chained together to create a continual sequence of information to be displayed on the portal device 150 or the client 140. The particular programs generated by users may depend on whether a wireless portal device 150 is being used. For example, a microprogram designed to download up-to-date stock quotes may require a wireless connection to the portal server 110 to be effective.

As illustrated in FIG. 7, users may also program animation and/or sound into the portal device 150. For example, block 710 points to a particular image file (e.g., a bitmap file) and block 715 points to a particular music file (e.g., a Musical Instrument Digital Interface or "MIDI" file). The user may cause the image to move across the display 430 of the portal device 150 in a specified direction by programming block 720 (e.g., using X and Y coordinate data). Concurrently, the user may program block 725 to play the music track identified in block 715. Temporal link 722 indicates that the movement of the image and the playback of the music track are to take place simultaneously. Programming block 720 indicates that the music and image will both fade out to end the program.

In one embodiment, standard image and/or music files stored on the client 140 are converted to a format which the portal device can interpret (e.g., using a conversion module which may included in the client plug-in). For example, the melody line may be extracted from a MIDI file and transmitted to the portal device as a series of notes. Similarly, bitmap or JPEG images may be converted so that they are properly displayed on the portal device display 430, which in one embodiment is a black & white LCD display.

Portal Key Operations

In one embodiment, each portal device 150 includes a portal key which uniquely identifies the device, the user and/or particular data on the portal server. The key may either be permanently embedded in the device (e.g., the key may be the serial number) or, alternatively, may be selected manually by the user (e.g., the user's ID on the portal server 110) or may be assigned to the device by the portal server 110.

Figure 8:
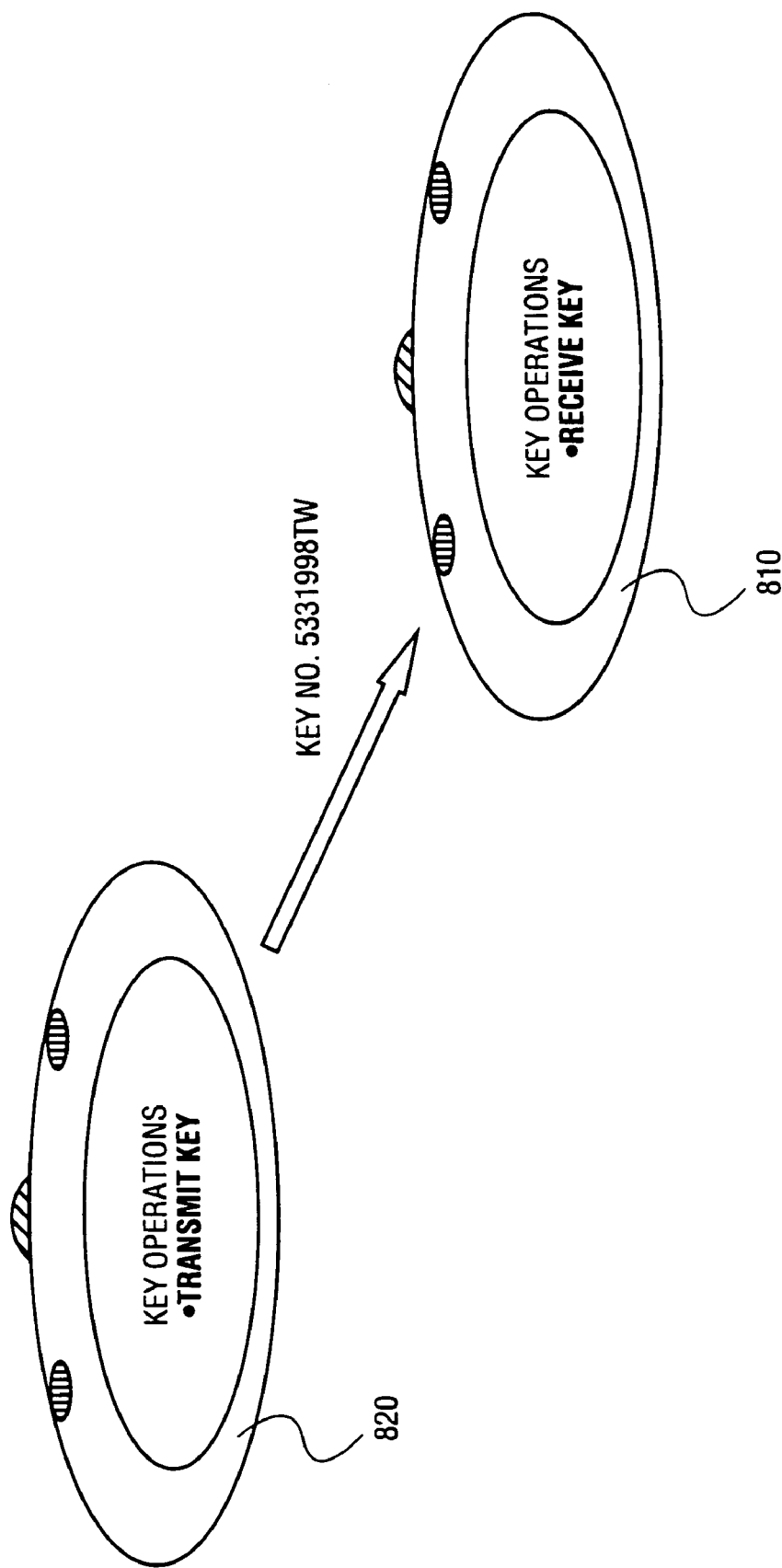
FIG. 8 illustrates portal device communication according to one embodiment of the invention.

Regardless of how the portal key is generated, as illustrated in FIG. 8, in one embodiment users may exchange keys between portal devices. Specifically, portal device 810 is shown receiving a portal key (key no. 5331998TW) from portal device 820. In one embodiment, when the user of portal device 810 connects to the portal server 110 after receiving the portal key, he/she will be provided with access to information and/or services associated with the portal key. For example, the user of portal key 820 may store personal and/or business-related information on the portal server 110 which he/she wants to share with the user of portal device 810.

Several portal key applications may be implemented using this type of portal key exchange. These include, for example, social invitations; "business card" exchanges (i.e., where the user of portal device 820 stores an online business card on portal server 110); personal photo exchanges; and/or exchanges of any other information adapted to be stored on a computer network. It should be noted, however, that the underlying principles of the invention are not limited to any particular type of informational exchange.

Exchanging portal keys in the foregoing manner provides an efficient mechanism for exchanging information using a limited amount of portal device memory because the underlying information is stored on the portal server 110, rather than the portal device 150 itself. In addition, when a user exchanges a key, the user is then free to continually update the information/services on the portal server 110 to which the key provides access. For example, a user may exchange a key with a prospective employer, and subsequently update his/her resume on the portal server 110. Similarly, if the user is involved in research, he/she may exchange his/her key with colleagues and continually update the research data on the portal server 110.

In one embodiment, a user may set up a number of different keys on the portal server, each pointing to a different type of information and/or service. The user can then select a particular key to transmit to a second user (e.g., using the portal device controls 440, 441, 450) depending on the information and/or service to be provided to the second user. For example, a user may establish a business key which points to business-oriented information/services (e.g., a firm brochure) and a personal key which points to personal information/services (e.g., personal photos). In one embodiment, the portal device 150 will include one standard key for generally identifying the portal device 150 to the portal server 110 and other users, and any number of user-defined "sub-keys" which can be used to exchanged more specific user data (e.g., such as the business data and personal data described above).

Various advertising and promotional services may be implemented in accordance with the underlying principles of the invention. In one embodiment, portal devices may be set up to broadcast keys to users at a place of business such as a supermarket or a car dealership. A user may choose to receive the key on his/her portal device and thereby acquire additional information about the product/service associated with the key when he/she logs in to the portal server 110. Businesses may offer various types of Internet promotions/discounts to users in this manner. Conversely, a user may choose to transmit his/her key to a portal device located at a business to request that the business automatically contact the user with additional product/service information (e.g., via email, a telephone call, etc).

In one embodiment, advertisements and/or coupons may be transmitted to the user's portal device 150. This may be accomplished over the client link 160 and/or the RF link 220. If transmitted over the client link 160, the ad/coupon may be programmed to trigger at a statistically effective time (one embodiment of the portal device 150 includes a digital clock). For example, a Starbucks® Coffee ad may be downloaded to the portal device 150 at a random time and may be programmed to trigger in the morning, before the user heads in to work. Personal information known about the user (e.g., the user's preferences, the user's daily schedule, etc) may be factored in to the timing decision and/or the decision as to which ads to transmit to the user. The ad/coupon may also be triggered automatically at any time/date via the RF link 220.

If a coupon is transmitted, the user may redeem the coupon in a number of ways. In one embodiment, the user may simply show the coupon code to an employee working at the business for which the coupon is valid. Alternatively, a portal device may be configured directly at the business to automatically redeem coupons (e.g., via a coupon exchange feature similar to the key exchange feature described above). The business' portal device may communicate with the portal server 110 to continually transmit and receive coupon data. In one embodiment, the user's portal device is configured to display a bar code identifying the received coupon/service which may be interpreted by a bar code device at the business to redeem the coupon/service. The underlying principles of the invention may be implemented using various additional advertisement and/or coupon redemption mechanisms.

In one embodiment, a coupon or advertisement may be transmitted to the user's portal device 150 from a portal device located at a business (in contrast to the embodiment above, where the coupon/advertisement is transmitted by the portal server 110). In this embodiment, the user's portal device 150 may automatically trigger the advertisement/coupon when it is brought within range of the business' portal device. In one embodiment, the business' portal device transmits a key to the user's portal device 150, which the user may subsequently use to obtain additional information from the portal server 110 (e.g., relating to a particular product or service). In this embodiment, the business' portal device may or may not communicate directly with the portal server 110.

It should be noted that the foregoing description of portal devices and associated methods includes various business methods. In addition, according to one particular business method, once a user registers on the portal server 110, the PO will assign a portal device 150 to the user free of charge (or for some nominal fee). Upon receipt of the portal device 150 (e.g., in the mail), the user will attach the portal device (e.g., via the client link 160), and register the portal device 150 with the portal server 110. The user may then configure the manner in which he/she will use the portal device 150 (e.g., by selecting the types of portal data/microprograms to be processed and stored in the device). In one embodiment, users will be given the option to upgrade to a more advanced portal device 150 for a specified fee. In one embodiment, however, the fee will be no more than the cost of manufacturing and shipping the device to the user.

In one embodiment, the portal device 150 is shipped to the user with pre-configured data and/or advertisements already stored within the device 150. This may include, for example, the user's name and address; scheduling data for the user for the day/week on which the user will receive the device; and/or any other data stored by the user on the portal server 110.

In one particular embodiment, the portal device 150 is configured to display shipping information (e.g., the shipping bar code and/or destination address) on its display 430. This shipping information may be used by the shipping company to transport the portal device 150 to the user. This embodiment may be shipped to the user using transparent packaging so that the shipping data may be easily read/scanned.

Additional Embodiments

As mentioned above, the portal device 150 may communicate with the portal server 110 using various RF communication techniques. For example, in one particular embodiment, the portal device 150 transmits and receives data to/from a cellular network via the cellular digital packet data ("CDPD") standard. As it is known in the art, the CDPD standard is a digital wireless standard that is deployed as an enhancement to the existing analog cellular network. It provides a packet overlay onto the AMPS network and moves data at 19.2 Kbps over continuously-changing unused intervals in standard voice channels. Accordingly, this embodiment of the portal device is capable of exploiting normally unused bandwidth on a nation-wide, analog cellular network. Embodiments of the portal device may also be configured to transmit/receive data using a variety of other communication standards including 2-way paging standards and third generation ("3G") wireless standards (e.g., UTMS, CDMA 2000, NTT DoCoMo, . . . . etc).

Figure 9:
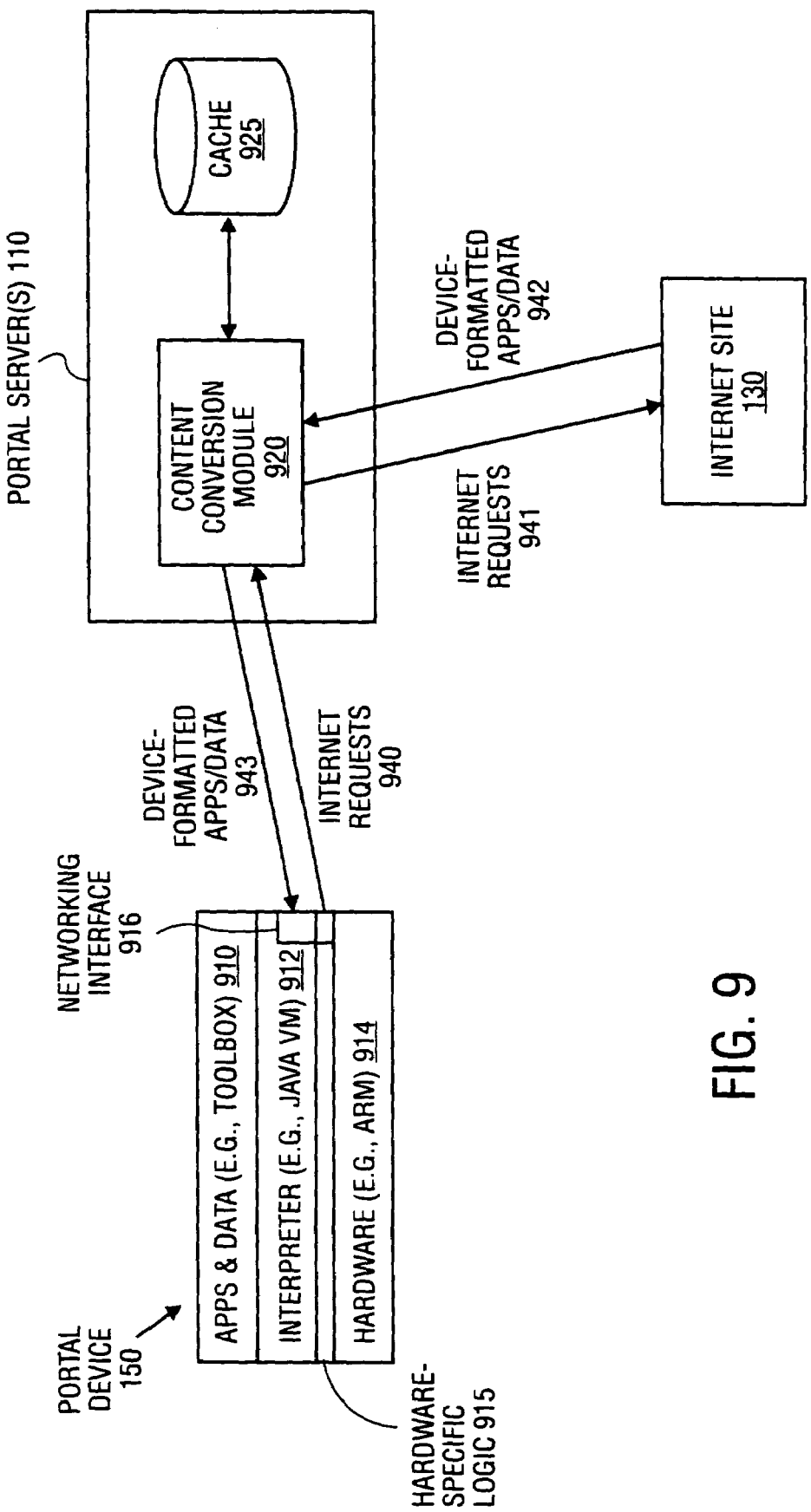
FIG. 9 illustrates one embodiment of a portal device communicating with a portal server.

As described above, because certain embodiments of the portal device 150 are configured to process hardware-independent interpreted code (e.g., via an interpreter module 520 such as a Java virtual machine), applications may be ported to new hardware platforms without significant changes. In addition, as illustrated in FIG. 9, in one embodiment, communications functionality is provided via a modular networking interface 916, which may be easily modified/replaced without altering existing portal device applications 910 or significant portions of the bytecode interpreter 912. For example, when changing from a CDPD network to a 3G network, only the network interface component 916 of the VM interpreter 912 will need to be updated (along with any required 3G hardware 914) to support the new 3G protocol.

As described above (and as indicated in FIG. 9), in one embodiment, the interpreter module 912 on the portal device 150 is a Java virtual machine. As such, this embodiment of the portal device 150 is capable of executing a vast library of existing hardware-independent Java applications (e.g., applets/bytecodes) 910. Moreover, as indicated in FIG. 9, one embodiment of the portal device employs a 32-bit RISC-based microprocessor such as an ARM processor. As is known in the art, ARM processors are widely used in PDAs, cell phones and a variety of other wireless devices. It should be noted, however, that various other hardware and software (and/or firmware) architectures may be used for the portal device 150 while still complying with the underlying principles of the invention.

As described above, one embodiment of the portal server 110 converts standard applications and data into a format which the portal device 150 can properly interpret. Accordingly, as illustrated in FIG. 9, this embodiment of the portal server 110 may include a content conversion module 920 for processing portal device 150 requests for Internet content 940. More particularly, in one embodiment, the portal server 110 acts as a proxy for the portal device 150, forwarding Internet requests 940, 941 to the appropriate Internet site 130 on behalf of the portal device 150, receiving responses from the Internet site 130 in a standard Internet format (e.g., Web pages with embedded audio/video and graphical content), and converting the standard Internet responses 924 into a format which the portal device 150 can process (e.g., bytecodes).

For example, the conversion module 920 may include a hypertext markup language ("HTML") rendering module (not shown) for interpreting HTML code and downloading any embedded content in the HTML code (e.g., graphics, video, sound, . . . etc) to the portal server 110. The conversion module 920 may then combine the HTML code and embedded content and generate a set of bytecodes for accurately reproducing the requested content on the portal device 150. As described above, in one embodiment, the bytecodes may be Java bytecodes/applets. However, various other types of interpreted and/or non-interpreted code may be generated, depending on the particular type of portal device 150 being used (e.g., one with an interpreter module or one without).

Because the portal server 110 has an intimate knowledge of the capabilities/configuration of each portal device 150 (e.g., screen size, graphics/audio capabilities, available memory, processing power, user preferences, . . . etc) it can reconstruct the requested Internet content accurately, while at the same time minimizing the bandwidth required to transmit the content to the device 150. For example, the conversion module 920 may perform pre-scaling and color depth adjustments to the requested content so that it will be rendered properly within the portal device 150 display. In making these calculations, the conversion may factor in the memory and processing power available on the portal device 150. In addition, the conversion module 920 may compress the requested content using a variety of compression techniques (and is thereby preserve network bandwidth).

In one embodiment, the conversion module 920 will simply discard Internet content which either cannot be reproduced on the portal device 150, or which the user has indicated that he/she does not want to be reproduced on the portal device. For example, a user may indicate that he/she does not want sounds to be generated on the portal device 150 or that he/she does not want advertisements transmitted to the portal device 150. The conversion module 920 will then remove any sounds or advertisements embedded in the requested Web page (or other requested Internet content). Because HTML rendering and other advanced processing of Internet content/data is offloaded to the portal server 110 as described above, the portal device 150 can be manufactured using a low power microprocessor or microcontroller, thereby lowering the cost of manufacture and/or the energy consumed by the device 150.

In one embodiment, when a particular Web page or other Internet object has been converted into a format suitable for execution on the portal device 150 (e.g., Java bytecodes and data) the formatted page/object may be stored locally on a cache 925 at the portal server 110 (or other server maintained by the PO). Thus, the next time the content is requested, the conversion module 920 may simply read the previously-generated code from the local cache 925 (i.e., it will no longer need to retrieve the content from remote locations to reconstruct the code).

Various caching techniques and algorithms may be implemented to ensure that the cache 925 is storing Internet data efficiently (i.e., resulting in an acceptable percentage of cache 'hits') and that the data is current. For example, the portal server 110 may cache the most frequently-requested Internet data (e.g., the Yahoo™ home page), and may remove content from the cache based on a least-recently used caching policy. In addition, to ensure that data stored in the cache is current, the portal server 110 may compare the version of the data stored in the cache 925 with the version of data stored at the remote Internet site 130 when the data is requested. Similarly, the portal server 110 may store data in the cache 925 for some predetermined period of time before checking the remote server 130 for a new version. Various other Internet caching techniques may be employed while still complying with the underlying principles of the invention (e.g., those defined in the Internet Caching Protocol ("ICP") and/or the Cache Array Routing Protocol ("CARP")).

Adjustable Display

Figure 10A:
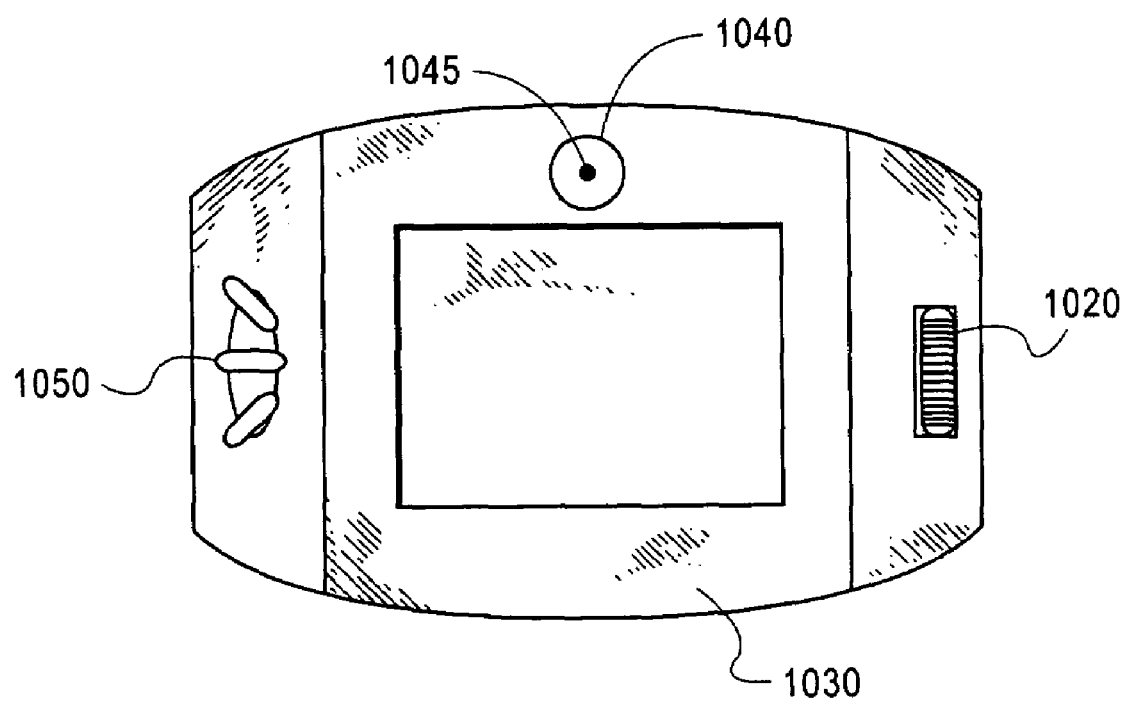
FIGS. 10a-c illustrate one embodiment of an adjustable data processing apparatus.
Figure 10B:
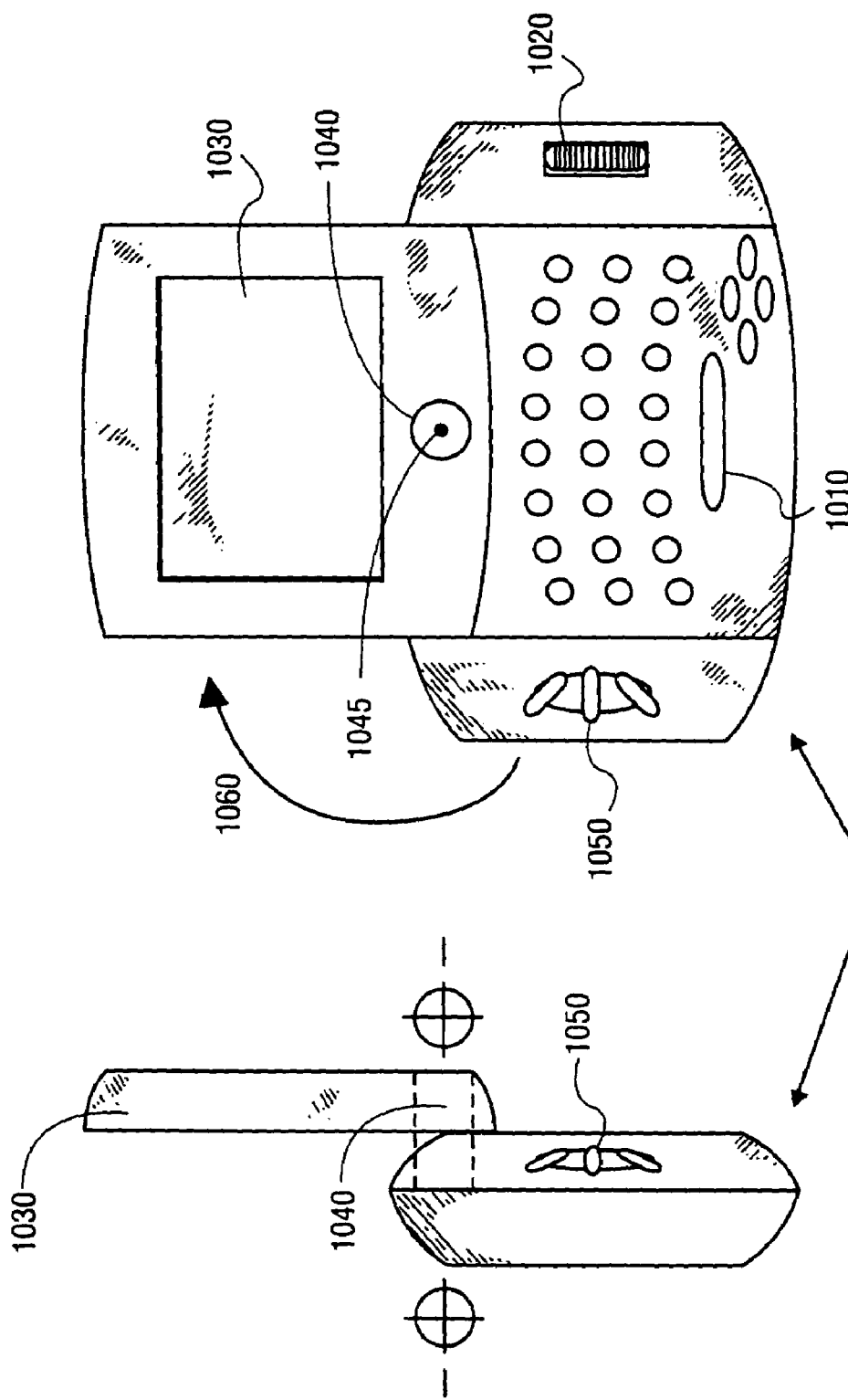
Figure 10C:
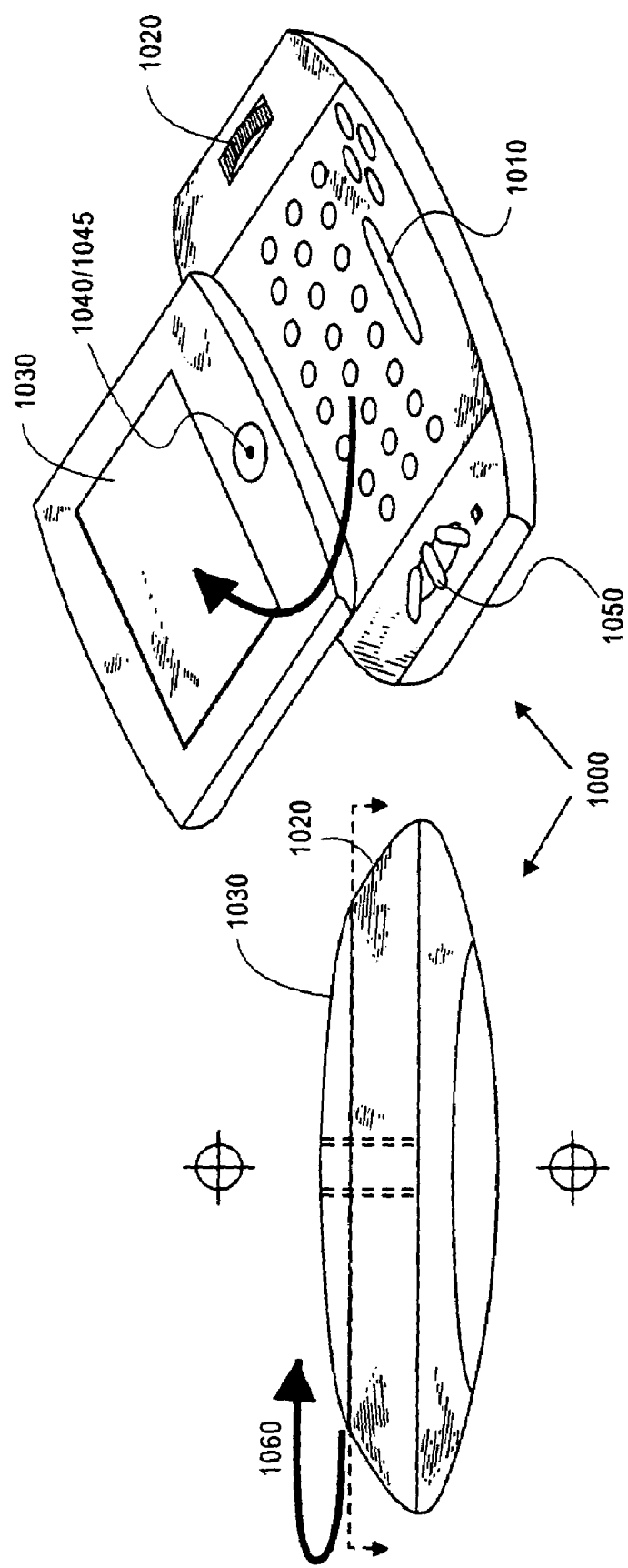

Illustrated in FIGS. 10a, 10b and 10c is a data processing device 1000 with an adjustable display 1030 according to one embodiment of the invention. The data processing device 1000 in one embodiment is a portal device 150 described above. However, the adjustable display 1030 may be employed on virtually any type of device capable of processing data. In one embodiment, the data processing device 1000 is comprised of a keyboard 1010, a control knob/wheel 1020 (e.g., for scrolling between menu items and/or data), and a set of control buttons 1050 (e.g., for selecting menu items and/or data). However, it should be noted that the specific control knob, control button and keyboard configuration illustrated in FIGS. 10a-c is not required for complying with the underlying principles of the invention.

In one embodiment, the display 1030 is pivotally coupled to the data processing device 1000. More specifically, the display 1030 pivots within a plane around a pivot point 1045, located within pivot area 1040, from a "closed," or first position illustrated in FIG. 10a to an "open," or second position illustrated in FIGS. 10b-c. When in a closed position, the display 1030 covers the keyboard 1010 thereby decreasing the size of the device 1000 and protecting the keyboard 1010. Even when the display is in a closed position, however, the control knob 1020 and control buttons 1050 are exposed and therefore accessible by the user. The motion of the display 1030 from a closed position to an open position is indicated by motion arrow 1060 illustrated in FIGS. 10a-b. As illustrated, when in an open position, the keyboard 1010 is fully exposed. Accordingly, it will be appreciated that the display is viewable, and data is accessible by the user in both an open and a closed position (although access to the keyboard is only provided in an open position).

In one embodiment, a switch within the device 1000 (not shown) is triggered when the display 1030 is moved from one position to the next. Hardware/software within the device may be configured to read the position of the switch and invert images rendered on the display based on the switch position. Accordingly, images are rendered on the display 1030 right-side-up, regardless of whether the display 1030 is in an open or a closed position. In addition, in one embodiment, a different user interface (or other operating systems functions) may be triggered by the switch. For example, when the display is moved into a closed position, a user interface may be displayed which is more easily navigable with only the control buttons 1050 and control knob 1020 (i.e., without the use of the keyboard 1010). Various other interface functions may be triggered by the switch consistent with the underlying principles of the invention. Moreover, various different types of switches may be employed on the device 1000 including standard mechanical switches, electrical switches (e.g., capacitive/magnetic switches), or any combination thereof.

If standard electrical wiring is used to electrically couple the data processing device 1000 and the display 1030, the pivot area 1040 should be wide enough to accommodate the wiring. However, various different types of electrical connections may be employed between the data processing device 1000 and the display 1030 while still complying with the underlying principles of the invention. For example, in one embodiment, the display 1030 may be communicatively coupled to the processing device 1000 via a wireless connection (e.g., using the Bluetooth standard, IEEE 802.11b, a capacitive coupling, . . . etc). If configured with a wireless connection, the display 1030 may be detachable from the processing device 1000.

Moreover, various types of physical connections may be used to rotatably mount the display 1030 to the processing device 1000. For example, in one embodiment, the device 1000 is cooperatively mated to the display 1030 with a set of circular guide rails or tracks (not shown).

The control knob 1020 and control buttons 1050 may be programmed to perform various functions within applications executed on the processing device 1000. For example, if an email client application is executed on the device 1000, the control knob 1020 may be configured to scroll through the list of email messages within the user's inbox (e.g., with the current email message highlighted on the display 1030). One of the control buttons 1050 may be configured to select a particular email message within the list. A second control button may be configured as a "back" button, allowing the user to back out of selected email messages and/or to move up through the menu/folder hierarchy. A third control button may be configured to bring the user to a desired location within the email application (e.g., to the top of the menu/folder hierarchy) or within the operating system executed on the processing device 1000. In one embodiment, the functions to be executed by the buttons 1050 and control knob 1020 may be programmed by the end-user. In addition, various different control elements may be employed on the processing device 1000 while still complying with the underlying principles of the invention.

Figure 11A:
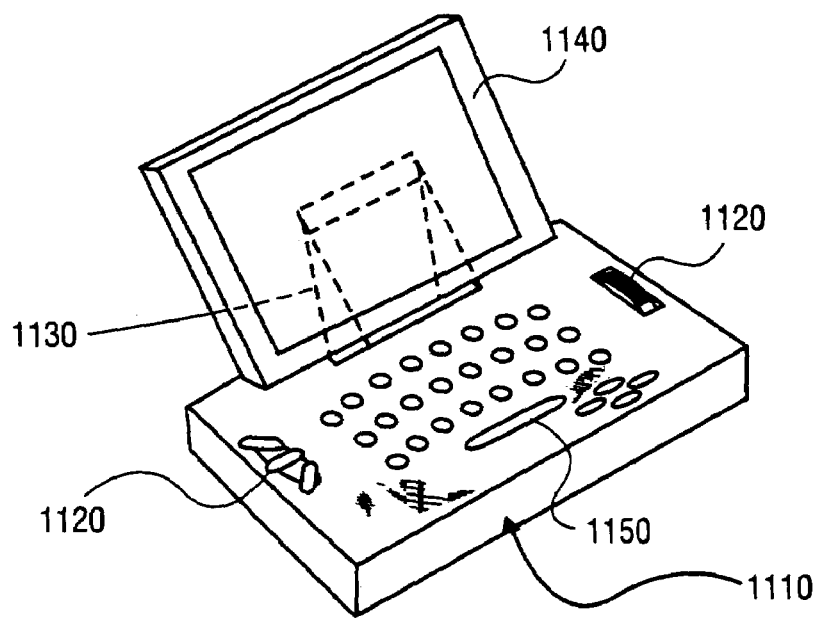
FIGS. 11a-c illustrate another embodiment of an adjustable data processing apparatus.
Figure 11B:
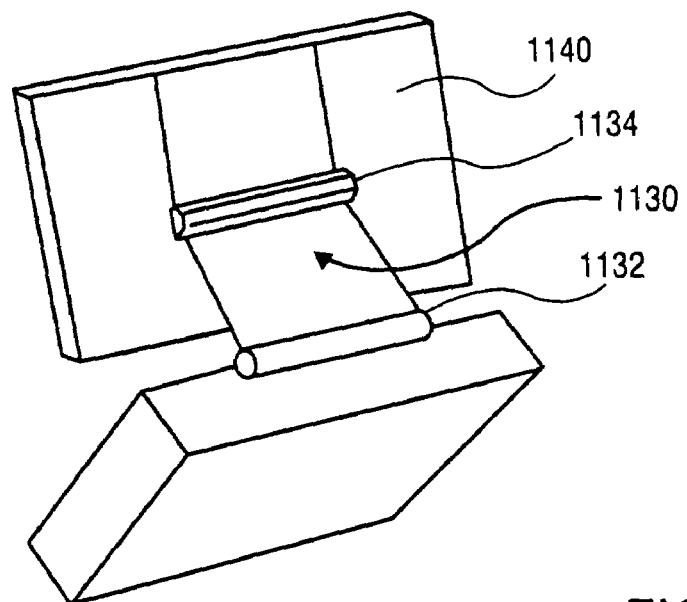
Figure 11C:
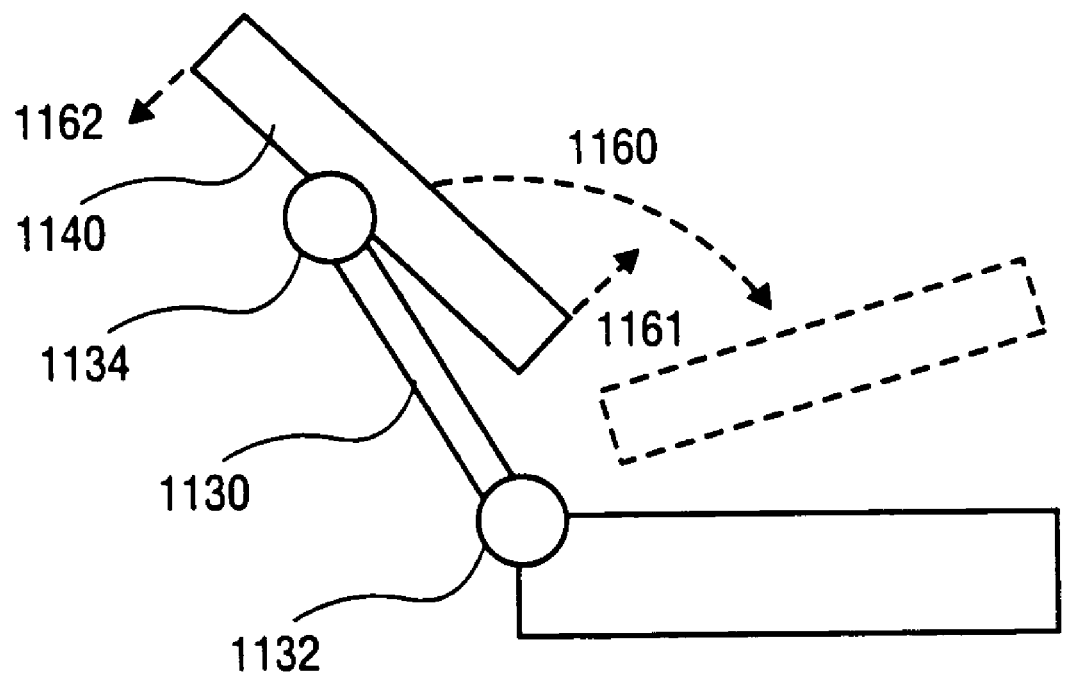

Illustrated in FIGS. 11a-c is a data processing device 1110 with an adjustable display 1140 according to another embodiment of the invention. The adjustable display 1140 of this embodiment is connected to the device 1110 via a support arm 1130, rotatably coupled to the data processing device 1110 and the display 1140 by a set of hinges 1132 and 1134, respectively. The display 1030 may be folded into a "closed" position as indicated by motion arrows 1160-1162 illustrated in FIG. 11c. When in a closed position, the display 1140 covers the keyboard 1150, thereby decreasing the size of the device 1000 and protecting the keyboard 1150. As illustrated, this embodiment may also include a control knob 1120 and a set of control buttons 1125 which are accessible by the user when the display 1140 is closed.

As with the prior embodiment, the display 1140 of the present embodiment is viewable by the user regardless of whether it is in an open position or a closed position. In other words as the display 1140 is moved into a closed position over the keyboard with the display 1140 screen faced in an upward direction as indicated by the motion arrows 1160-1162 (i.e., so that the user may view and access data using the control buttons 1125 and control knob 1120). Moreover, although this embodiment may not require a switch to invert images on the display 1140 as described above, a switch may be employed in the present embodiment to adjust the user interface (e.g., for use with the control knob 1120 and/or control buttons 1125).

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while the system described above employs a single portal server 110, alternative embodiments of the invention may include numerous different servers (e.g., database servers, web servers, etc), and/or mirrored servers distributed across a network. Moreover, while the embodiments described above focus on a portal device which executes interpreted code (e.g., Java bytecodes), the principles of the invention may also be implemented on devices which execute non-interpreted code. Accordingly, the scope and spirit of the invention should be judged in terms of the claims which follow.

What is claimed is:

1. An apparatus comprising:
  a data processing device;
  a first group of control elements and a second group of control elements integrated directly on said data processing device;
  a display comprising a display area for rendering images generated by said data processing device, said display coupled to said data processing device at a pivot point and rotatable around said pivot point from a first position to a second position, wherein said display is viewable in both said first position and said second position and wherein both said first and second groups of control elements are exposed when said display is in said second position, and wherein only said second group of control elements are exposed when said display is in said first position,
  wherein said first group of control elements are covered by said display when said display is in said first position and said second group of control elements are not covered by said display when said display is in said first position; and
  wherein said second group of control elements comprise a control knob and a set of control buttons; and
  a switch configured to trigger when said display is rotated from said second position to said first position.

2. The apparatus as in claim 1 wherein said first group of control elements comprise a keyboard.

3. The apparatus as in claim 1 wherein said display is inverted when in said second position relative to said first position.

4. The apparatus as in claim 1 further comprising:
  image inversion logic to invert images on said display responsive to said switch triggering.

5. The apparatus as in claim 1 wherein the control knob is configured to scroll between menu items and/or data and the control buttons are configured to select the menu items and/or data when said display is in both said first position and said second position.

6. An apparatus comprising:
  a data processing device having a first group of control elements and a second group of control elements; and
  a display having a display area defining a plane, the display rotatably coupled to said data processing device and configured to rotate around an axis of rotation within said plane from a first position to a second position, said axis of rotation being substantially perpendicular to said plane for at least a portion of said rotation of said display, wherein images displayed on said display are viewable in both said first position and said second position,
  wherein said first group of control elements are covered by said display when said display is in said first position and said second group of control elements are not covered by said display when said display is in said first position; and wherein said first group of control elements comprise a keyboard and said second group of control elements comprise a control knob and a set of control buttons; and
  a switch configured to trigger when said display is rotated from said first position to said second position.

7. The apparatus as in claim 6 further comprising:
  image inversion logic to invert images on said display responsive to said switch triggering.

8. The apparatus as in claim 6 wherein said control knob is configured to scroll between items within a list.

9. The apparatus as in claim 8 wherein one of said control buttons is configured to select items within said list.

10. The apparatus as in claim 9 wherein one of said control buttons is configured to back out of selected items.

11. The apparatus as in claim 6 wherein said control buttons and control knob are user-programmable.

12. The apparatus as in claim 6 wherein the control knob is configured to scroll between menu items and/or data and the control buttons are configured to select the menu items and/or data when said display is in both said first position and said second position.

13. An apparatus comprising:
  a data processing device;
  a first group of control elements and a second group of control elements integrated directly on said data processing device; and
  a display having a viewable area for viewing images generated by said data processing device, said display cooperatively engaged with said data processing device to move from a first position to a second position, wherein images are viewable within said viewable area when said display is in said first position and said second position,
  wherein both said first group of control elements and said second group of control elements are exposed when said display is in said second position, and wherein only said second group of control elements are exposed when said display is in said first position,
  wherein said first group of control elements comprises a keyboard and wherein said second group of control elements comprises a control knob,
  wherein said second position is inverted with respect to said first position; and
  a switch configured to trigger when said display is rotated from said second position to said first position.

14. The apparatus as in claim 13 wherein said display is rotatably coupled to said data processing device and configured to rotate within a plane substantially perpendicular to said display's axis of rotation between said first position and said second position.

15. The apparatus as in claim 13 wherein images displayed on said display are inverted relative to said display when said display is moved between said first position and said second position.

16. The apparatus as in claim 15 further comprising image inversion logic to invert images on said display responsive to said switch triggering.

17. The apparatus as in claim 13 wherein the control knob is configured to scroll between menu items and/or data, the apparatus further comprising control buttons configured to select the menu items and/or data when said display is in both said first position and said second position.

* * * * *